(12) United States Patent
Schwindt et al.

(10) Patent No.: US 11,049,393 B2
(45) Date of Patent: Jun. 29, 2021

(54) SYSTEMS AND METHODS FOR VEHICLE TO IMPROVE AN ORIENTATION ESTIMATION OF A TRAFFIC PARTICIPANT

(71) Applicant: Robert Bosch GmbH, Stuttgart (DE)

(72) Inventors: Oliver F. Schwindt, Sunnyvale, CA (US); Tobias Berling, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 16/754,634

(22) PCT Filed: Oct. 11, 2018

(86) PCT No.: PCT/EP2018/077684
§ 371 (c)(1),
(2) Date: Apr. 8, 2020

(87) PCT Pub. No.: WO2019/072949
PCT Pub. Date: Apr. 18, 2019

(65) Prior Publication Data
US 2020/0357275 A1 Nov. 12, 2020

Related U.S. Application Data

(60) Provisional application No. 62/572,390, filed on Oct. 13, 2017.

(51) Int. Cl.
*G08G 1/056* (2006.01)
*B60Q 9/00* (2006.01)
*G08G 1/16* (2006.01)

(52) U.S. Cl.
CPC ............... *G08G 1/056* (2013.01); *B60Q 9/00* (2013.01); *G08G 1/166* (2013.01)

(58) Field of Classification Search
None
See application file for complete search history.

(56) References Cited

U.S. PATENT DOCUMENTS 7,979,172 B2 7/2011 Breed
8,315,756 B2 11/2012 Caveney
(Continued)

FOREIGN PATENT DOCUMENTS

JP 2005267120 A 9/2005
WO 2017002441 A1 1/2017

OTHER PUBLICATIONS

International Search Report and Written Opinion for Application No. PCT/EP2018/077684 dated Apr. 5, 2019 (17 pages).

*Primary Examiner* — Carlos Garcia
(74) *Attorney, Agent, or Firm* — Michael Best & Friedrich LLP

(57) ABSTRACT

A system and method for estimating an orientation of a traffic participant. In one example, the system includes a sensor configured to detect a traffic participant and an electronic controller configured to receive a signal from the sensor, compare a location of the vehicle to a map of expected orientation of traffic participants to estimate an orientation of the traffic participant, perform a calculation based upon the signal from the sensor to estimate an orientation of the traffic participant if an expected orientation is not determined by the comparison of the location of the vehicle to the map of expected orientation of traffic participants, and generate a notification based upon the estimated orientation of the traffic participant.

20 Claims, 4 Drawing Sheets

(56) References Cited

U.S. PATENT DOCUMENTS

| | | |
|---|---|---|
| 9,360,328 B2 | 6/2016 | You et al. |
| 9,709,986 B2 | 7/2017 | Gdalyahu et al. |
| 9,711,050 B2 | 7/2017 | Ansari |
| 2013/0009792 A1* | 1/2013 | Shafaat ................ G08G 5/0021 340/979 |
| 2016/0357014 A1 | 12/2016 | Beckman |
| 2017/0103660 A1* | 4/2017 | Shafaat .................. B64D 45/04 |
| 2017/0182934 A1 | 6/2017 | Arita et al. |
| 2017/0277188 A1 | 9/2017 | Xu et al. |
| 2017/0282915 A1 | 12/2017 | Kim et al. |
| 2018/0181095 A1* | 6/2018 | Funk ....................... H04L 67/12 |

* cited by examiner

SYSTEMS AND METHODS FOR VEHICLE TO IMPROVE AN ORIENTATION ESTIMATION OF A TRAFFIC PARTICIPANT

CROSS REFERENCE TO RELATED APPLICATIONS

This application is a national phase filing under 35 U.S.C. 371 of International Patent Application No. PCT/EP2018/077684, which claims priority to U.S. Provisional Patent Application No. 62/572,390, filed Oct. 13, 2017, the application of which is incorporated herein by reference in its entirety.

FIELD

Embodiments relate to systems and methods for estimating an orientation of a traffic participant.

SUMMARY

Many modern vehicles require a means for not only detecting other vehicles in the general vicinity, but also determining where other vehicles may be navigating to. For instance, an autonomous or partially autonomous vehicle (sometimes referred to as a "host vehicle" may desire to track the heading or in some case the orientation of a separate vehicle (sometimes referred to as a "target vehicle") in order to determine if a collision will occur. To track the orientation of the separate vehicle, the autonomous vehicle utilizes a sensor to determine a distance between the two vehicles, estimate an orientation of the separate vehicle, and estimate a rate of change of the orientation of the separate vehicle.

Embodiments described herein relate to systems and methods for estimating an orientation of a separate vehicle and, more broadly, a traffic participant (which could include a separate vehicle, objects, and animals that may exist in traffic).

One embodiment provides a system for estimating an orientation of a traffic participant. The system comprises a sensor configured to detect a traffic participant; and an electronic controller configured to receive a signal from the sensor, compare a location of the vehicle to a map of expected orientation of traffic participants to estimate an orientation of the traffic participant, perform a calculation based upon the signal from the sensor to estimate an orientation of the traffic participant if an expected orientation is not determined by the comparison of the location of the vehicle to the map of expected orientation of traffic participants, and generate a notification based upon the estimated orientation of the traffic participant.

In another embodiment, a method for estimating an orientation of a traffic participant is described. The method comprises generating, with a sensor, a signal, receiving, with an electronic controller, the generated signal, comparing, with the electronic controller, a location of a vehicle to a map of expected orientation of traffic participants to estimate an orientation of the traffic participant, performing, with the electronic controller, a calculation based upon the generated signal from the sensor to estimate an orientation of the traffic participant if an expected orientation is not determined by the comparison of the location of the vehicle to the map of expected orientation of traffic participants, and generating, with the electronic controller, a notification based upon the estimated orientation of the traffic participant.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

For the purposes of this document, the term "traffic participant" is a vehicle, a pedestrian or other entity that actively interacts with a flow of traffic. For example, a vehicle driving in an adjacent lane is a traffic participant. In another example, a bicycle is a traffic participant.

For the purposes of this document, the term "orientation" is a direction of travel of a traffic participant. The orientation may include an angle of travel of the traffic participant, a heading or bearing, and the like. The orientation of the traffic participant may be in relation to a vehicle equipped with a system as described below.

Figure 1:
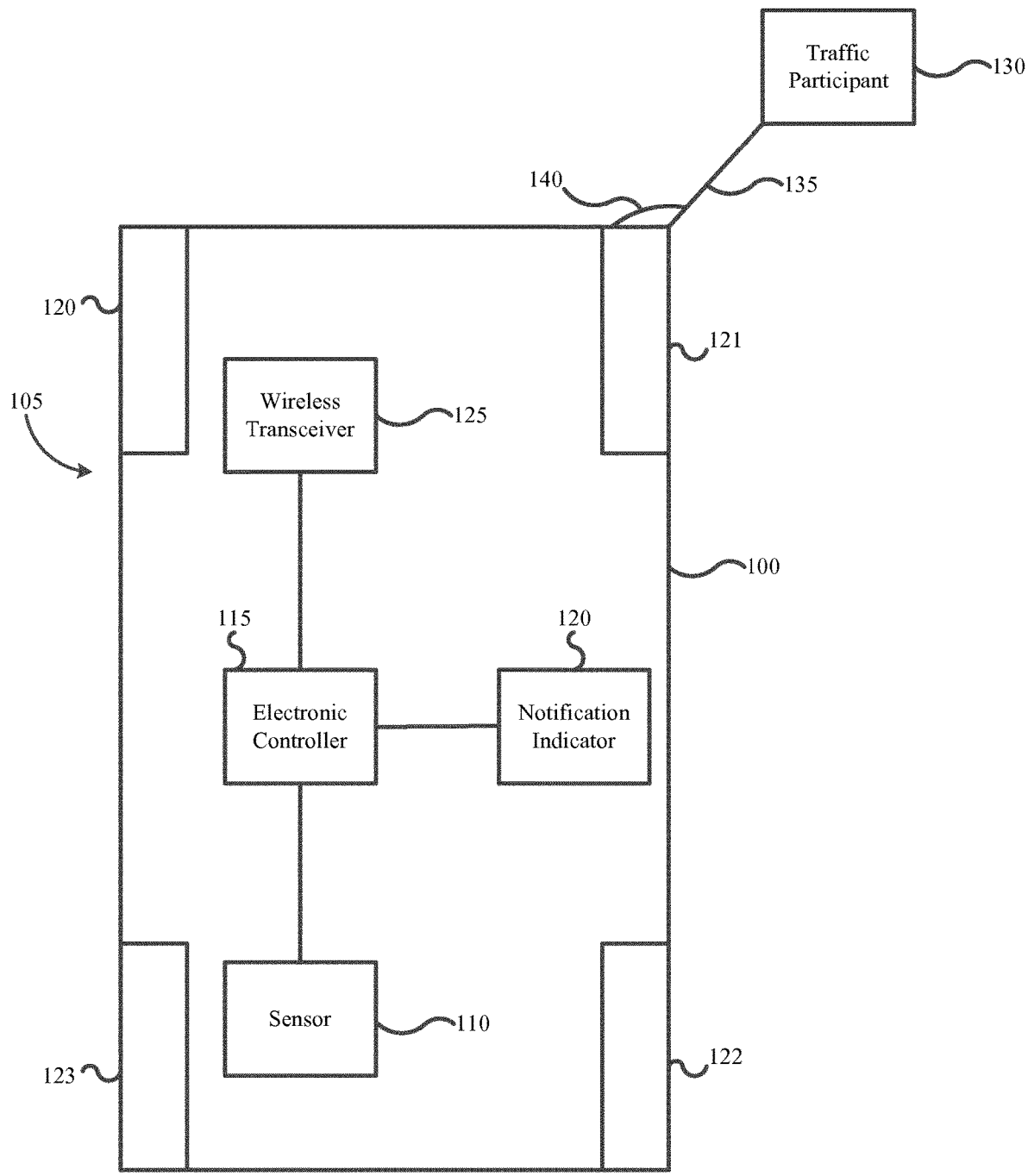
FIG. 1 is a block diagram of a vehicle with a system for estimating an orientation of a traffic participant according to one embodiment.

FIG. 1 illustrates an example of a vehicle 100 equipped with a system 105 for estimating an orientation of a traffic participant according to one embodiment. The system 105 comprises a sensor 110 and an electronic controller 115 and has one or more wheels 120-123.

The sensor 110 is configured to detect a traffic participant (such as traffic participant 130). In one embodiment, the sensor 110 is a laser sensor, such as a Lidar sensor. The sensor 110 is configured to detect a distance 135 to the traffic participant, an angle 140 of the traffic participant relative to the vehicle 100, a number of returns from the traffic participant to the sensor 110, and the like. The sensor 110 is, in one embodiment, an array of sensors positioned at various points on the vehicle 100 in order to detect a plurality of traffic participants in all directions around the vehicle 100.

The electronic controller 115 is communicatively coupled to the sensor 110 via various wired or wireless connections. In one embodiment, the electronic controller 115 is connected to the sensor 110 via a dedicated wire connection. In other embodiments, the electronic controller 115 is communicatively coupled to the sensor 110 via a shared communication link such as a vehicle communication bus (for example, a controller area network (CAN) bus) or a wireless vehicle network.

In some embodiments, the system 105 also includes a notification indicator 120. The notification indicator 120 is configured to provide a notification to an operator of the vehicle 100. In one embodiment, the notification indicator 120 is a display screen that displays the notification for the operator of the vehicle 100. In one example, the notification includes the location, estimated orientation, and other information of a traffic participant. The notification may also include information for more than one traffic participant. The notification indicator 120 is communicatively coupled to the electronic controller 115 in similar ways to the sensor 110 as discussed above.

In some embodiments, the system 105 also includes a wireless transceiver 125. The electronic controller 115 is configured to send and receive data with a remote location or a remote device via the wireless transceiver 125. The wireless transceiver 125 is communicatively coupled to the electronic controller 115 in similar ways to other components discussed above.

Figure 2:
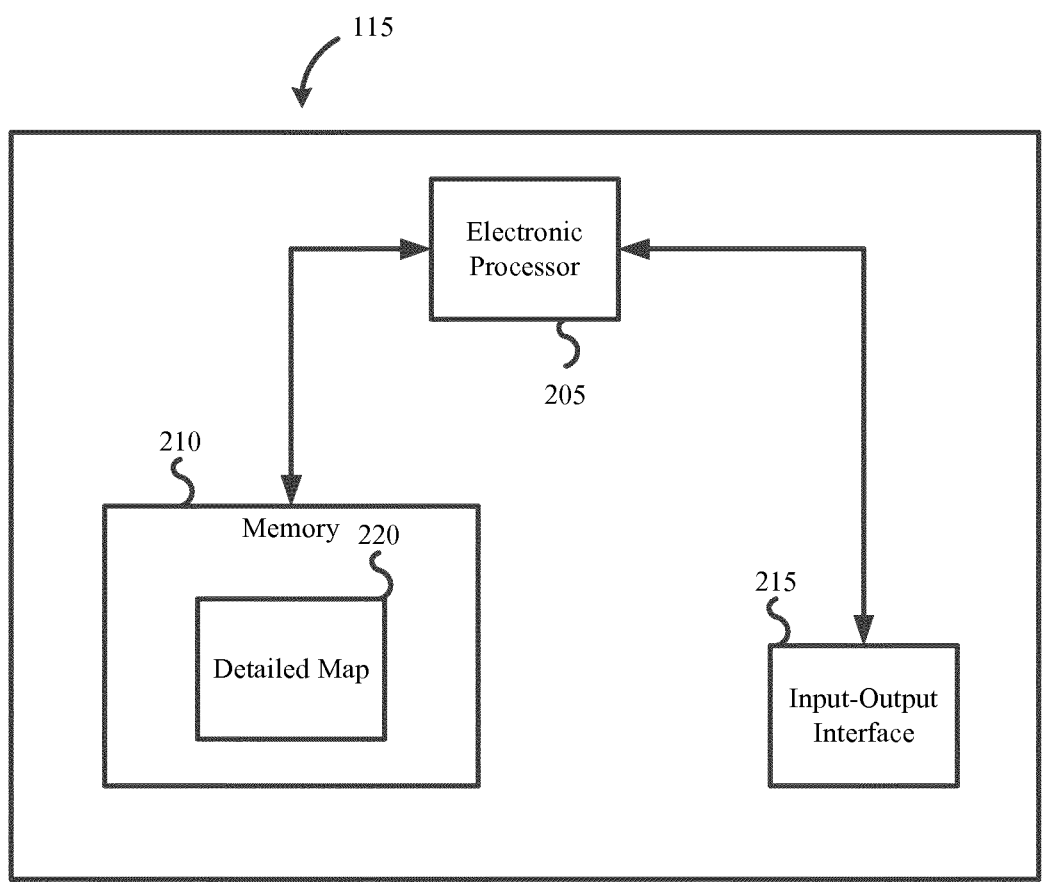
FIG. 2 is an illustrative example of an electronic controller according to one embodiment.

FIG. 2 is an illustrative example of an electronic controller, such as the electronic controller 115. The electronic controller 115 includes a plurality of electrical and electronic components that provide power, operation control, and protection to the components and modules within the electronic controller 115. In the example illustrated, the electronic controller 115 includes an electronic processor 205 (such as a programmable electronic microprocessor, microcontroller, or similar device), a memory 210 (for example, non-transitory, machine-readable memory), and an input-output interface 215. The electronic processor 205 is communicatively connected to the memory 210 and the input-output interface 215. The electronic processor 205, in coordination with the memory 210 and the input-output interface 215, is configured to implement, among other things, the methods described herein.

The memory 210 stores a detailed map 220. The detailed map 220 includes information about the direction of travel that other traffic participants other than the vehicle 100 would be expected to be present in. An embodiment of the detailed map 220 is discussed below.

The electronic controller 115, in some embodiments, may be implemented in several independent controllers (for example, programmable electronic control units) each configured to perform specific functions or sub-functions. Additionally, the electronic controller 115 may contain sub-modules that include additional electronic processors, memory, or application-specific integrated circuits (ASICs) for handling input-output functions, processing of signals, and application of the methods listed below. In other embodiments, the electronic controller 115 includes additional, fewer, or different components.

Figure 3:
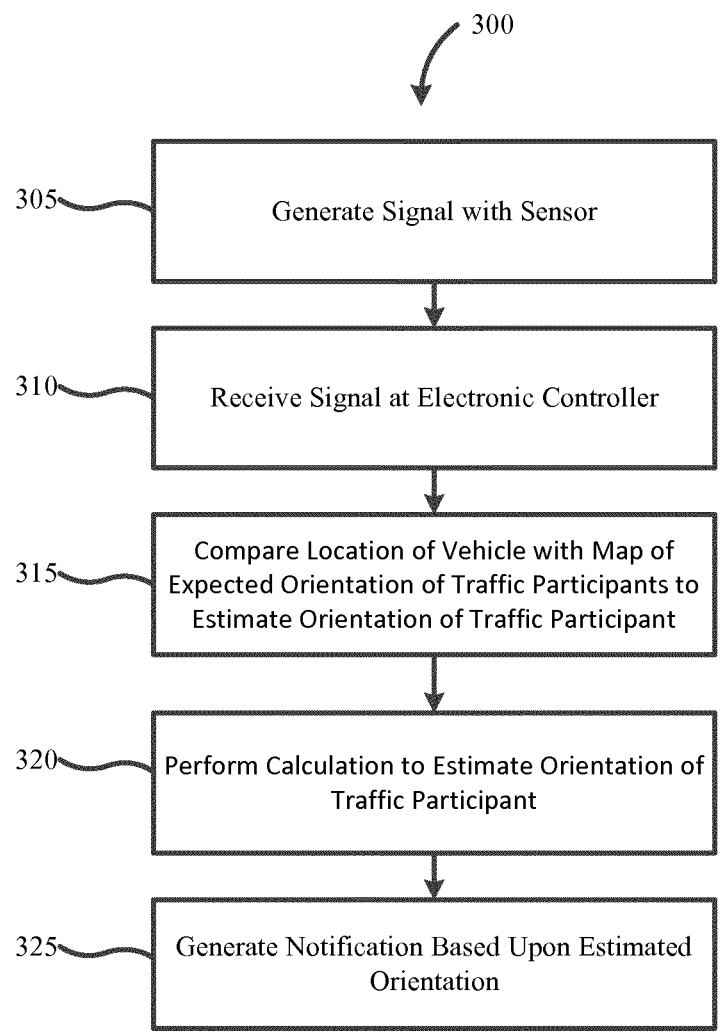
FIG. 3 is a flowchart illustrating a method of estimating an orientation of a traffic participant according to one embodiment.

FIG. 3 is a flowchart illustrating a method 300 of estimating an orientation of a traffic participant according to one embodiment.

The sensor 110 generates a signal (at block 305). In one embodiment, the sensor 110 detects a traffic participant along with information about the traffic participant, such as a distance from the vehicle 100 to the traffic participant, an angle of the traffic participant relative to the vehicle 100, and the like. In other embodiments, the sensor 110 is also configured to detect a number of returns that the sensor 110 receives from a traffic participant. For example, the sensor 110 may detect a traffic participant multiple times and determine an angle of the traffic participant relative to the vehicle 100, a distance from the vehicle 100, and the like based upon an average of the multiple detections. The sensor 110 then generates the signal in response to detecting the traffic participant. The signal, in some embodiments, includes the information (such as the distance from the vehicle 100 to the traffic participant) detected by the sensor 110.

The sensor 110 then sends the generated signal to the electronic controller 115, which receives the generated signal (at block 310). The electronic controller 115 receives the generated signal through the input-output interface 215. In some embodiments, the information contained within the generated signal is stored in the memory 210 before being processed by the electronic processor 205 of the electronic controller 115.

Figure 4:
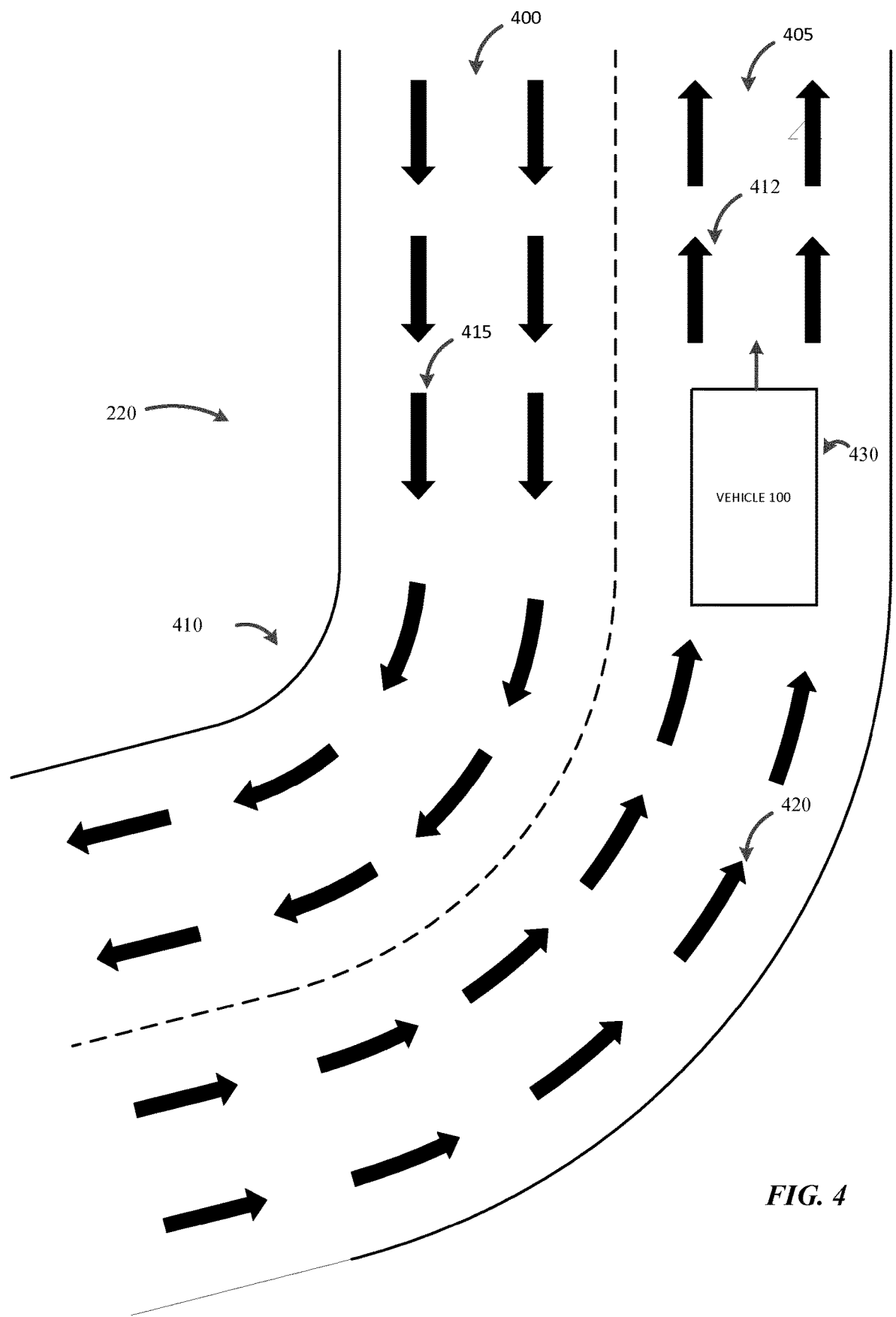
FIG. 4 illustrates a detailed map according to one embodiment.

The electronic controller 115 compares a location of the vehicle 100 with the detailed map 220 of expected orientation of traffic participants to estimate an orientation of the traffic participant (at block 315). An example of the detailed map 220 is illustrated in FIG. 4.

The detailed map 220 contains information about how many lanes (such as lanes 400 and 405) are on a particular road 410 and also indicates the expected direction of travel of traffic participants located in the lanes 400 and 405 (such as an expected direction of travel for a one way lane, an expected direction of travel for a particular lane of a multi-lane highway, and the like). For example, arrow 412 illustrates an expected direction of travel for traffic at the location of the arrow 412.

In some embodiments, the detailed map 220 is partially or wholly stored on a remote memory and not the memory 210. In these embodiments, the electronic processor 205 is configured to communicate with the remote memory to access the detailed map 220. It is to be understood that FIG. 4 illustrates a graphical representation of information that is stored in the memory 220.

Using the detailed map 220, the electronic controller 115 uses the signal sent from the sensor 110 to determine where a traffic participant is located on the detailed map 220 and, based upon the location of the traffic participant, estimate the orientation of the traffic participant using the expected direction of travel of the traffic participant, a determined lane the traffic participant is in, and the like. For example, in the detailed map 220, a vehicle detected at location 415 would have an expected orientation of 180° with respect to the vehicle 100, whereas a vehicle detected at location 420 would have an expected orientation of 30° with respect to the vehicle 100. As shown in FIG. 4, different locations (represented by arrows such as locations 412, 415, and 420) have different expected directions of travel (for example, at location 420, a different expected direction of travel is expected for a vehicle going around a curve than a vehicle traveling on a straight portion of the road 410, such as at location 412).

The vehicle 100 must also be able to be accurately located on the detailed map 220 (for example, at location 430). In some embodiments, the electronic controller 115 receives a location of the vehicle 100 via the wireless transceiver 125. The electronic controller 115 is configured to use the location of the vehicle 100 in order to determine the location of the traffic participant based upon a distance received by the sensor and an angle received by the sensor. The electronic controller 115 then uses this location to estimate an orientation of the traffic participant based upon the expected direction of travel for the determined location on the detailed map 220.

There are some scenarios in which the detailed map 220 will not be able to give an accurate estimation of orientation for a traffic participant. For example, in some circumstances, the traffic participant or the vehicle 100 is in a location that does not have an expected direction of travel, such as a parking lot or other large, open space. In another circumstance, the traffic participant or the vehicle 100 is at a location that has multiple expected directions of travel, such as an intersection, a roundabout, and the like.

If the detailed map 220 cannot give an accurate estimation of orientation, or if the detailed map 220 is not available, the electronic controller 115 performs a calculation based upon the signal from the sensor to estimate an orientation of the traffic participant (at block 320). The calculation is performed by the electronic processor 205 of the electronic controller 115.

The calculation, in some embodiments, assumes that all traffic is driving parallel to the vehicle 100. Using this assumption, the expected orientation of the traffic participant can be calculated. A second assumption is made in assuming the motion of the traffic participant is parabolic, and can be modeled as follows:

$$y = 0.5 * K * x^2 \quad \text{(Equation 1)}$$

where K is a road curvature (K) derived from 1/radius, x is a longitudinal distance, and y is as lateral distance.

The change in lateral distance over the change in longitudinal distance is equivalent to the tangent of the orientation angle, as shown in Equation 2, below.

$$\frac{dy}{dx} = K * x = \tan(\text{orientation}) \quad \text{(Equation 2)}$$

The orientation can then be derived as follows:

$$\text{orientation} = a\tan(K * x) \quad \text{(Equation 3)}$$

In this way, an orientation of the traffic participant can be determined. The electronic controller 115 is configured in some embodiments to store the orientation in the memory 210 and associate the orientation with the traffic participant. The electronic controller 115, in also embodiments, is able to store a plurality of traffic participants with associated orientations in the memory 210.

The calculation may also include determining a change in orientation over time, referred to hereinafter as a yaw rate. For example, the signal received from the sensor 110 may include a plurality of different times where the sensor 110 detected the traffic participant, each time including a different distance value. The electronic controller 115 is configured to perform Equation 3 for each received distance and determine a total change in orientation over a total change in time, as exemplified by Equation 4 below.

$$\text{yaw rate} = d(\text{orientation})/dt \quad \text{(Equation 4)}$$

The yaw rate may be associated with the traffic participant and stored in the memory 210 in some embodiments. The calculation that utilizes the detailed map 220 and the assumptions as stated above is hereinafter referred to as a yaw-constrained model.

In other embodiments, the electronic controller 115 is configured to track the traffic participant by performing the calculation multiple times and associating the result with the same traffic participant every time. The electronic controller 115 may associate an identity with each traffic participant being tracked in order to differentiate between different target traffic participants detected by the sensor 110.

In other embodiments, the calculation also includes utilizing a non-yaw-constrained model of determining orientation. In these embodiments, the non-yaw-constrained model makes up for the deficiencies of the yaw-constrained model. For example, in some embodiments, a traffic participant may be changing lanes, which utilizing the yaw-constrained model may give an inaccurate estimation of orientation of the traffic participant. Therefore, non-yaw-constrained models of tracking orientation may be utilized in conjunction with the yaw-constrained models to track the traffic participants.

The non-yaw-constrained models suffer their own deficiencies. For example, non-yaw-constrained models see high variance and inaccuracy in poor measuring conditions, such as poor angular accuracy of the sensor 110 in relation to the traffic participant, large distances between the sensor 110 and the traffic participant, too few returns of the signal of the sensor 110, and the like.

Some embodiments, therefore, combine a yaw-constrained model and a non-yaw-constrained model. To combine the yaw-constrained model and a non-yaw-constrained model, the electronic controller 115 is configured to determine what a probability that the yaw-constrained model is within an uncertainty of the non-yaw-constrained model is. Mathematically, and assuming a Gaussian distribution, the probability that the yaw-constrained model is within an uncertainty of the non-yaw-constrained model is:

$$\text{Likelihood of yaw constrained} = e^{\left(-0.5 * \frac{\left(\frac{\text{orientation of yaw constrained}-}{\text{orientation of non yaw constrained}}\right)^2}{\text{orientation variance of non yaw constrained}}\right)} \quad \text{(Equation 5)}$$

Because orientation is an angle, the difference needs to be the shortest path around a circle and needs to handle the −pi to pi boundary correctly. The likelihood_yaw constrained value gives the contribution factor of the yaw-constrained model. The non-yaw-constrained model's contribution factor would be 1−likelihood_yaw constrained. Other likelihood functions could also be utilized here.

An effect of mixing the yaw-constrained model and the non-yaw-constrained model is two-fold. First, if the non-yaw-constrained model has poor orientation estimation, then it would have a large variance. Even if the non-yaw-constrained estimation deviates considerably from the yaw-constrained model, the yaw-constrained model would be dominant and correct these tracks. Second, if the non-yaw-constrained model has good orientation estimation, it would have a small variance. If the non-yaw-constrained estimation deviates considerably, then the yaw-constrained model would essentially not contribute to the estimation. Therefore, for well-measured traffic participants, there is no dependency to follow the expected direction from the detailed map 220 or from the assumptions of all traffic participants driving parallel to the vehicle 100.

The electronic controller 115, after determining an estimated orientation of the traffic participant, generates a notification using the estimated orientation (at block 325). In some embodiments, the electronic controller 115 generates an identifier for the traffic participant and generates a notification using both the identifier and the estimated orientation of the traffic participant. In other embodiments, the notification may also include a position on the detailed map 220.

In some embodiments, the electronic controller 115 is also configured to send the notification to the notification indicator 120. For example, the notification indicator 120 may be a display screen, which then displays the detailed map 220 with a location of the vehicle 100 and a location and estimated orientation of the traffic participant displayed in real-time on the detailed map 220.

In some embodiments, the electronic controller 115 is configured to send the notification to a remote location or device via the wireless transceiver 125. For example, the vehicle 100 may be an autonomous vehicle. In this case, the vehicle 100 may be remotely monitored. The electronic controller 115 therefore creates the notification and sends the notification via the wireless transceiver 125 to the remote location so that a computer system or human operator can monitor the vehicle 100 and the traffic participants tracked by the system 105.

Various features, advantages, and embodiments are set forth in the following claims.

What is claimed is:

1. A system for a vehicle and for estimating an orientation of a traffic participant, the system comprising:
    a sensor configured to detect the traffic participant; and
    an electronic controller configured to
        receive a signal from the sensor,
        compare a location of the vehicle to a map of expected orientation of traffic participants to estimate an orientation of the traffic participant,
        perform a calculation based upon the signal from the sensor to estimate an orientation of the traffic participant if an expected orientation is not determined by the comparison of the location of the vehicle to the map of expected orientation of traffic participants, and
        generate a notification based upon the estimated orientation of the traffic participant.

2. The system of claim 1, wherein the signal from the sensor comprises at least one selected from the group of a distance to the traffic participant, an angle of the traffic participant relative to the vehicle, and a number of returns.

3. The system of claim 1, wherein the map of expected orientation of traffic participants is stored in a memory.

4. The system of claim 1, wherein, for each point on the map of expected orientation of traffic participants, the point has at least one selected from the group of a known orientation of traffic participants, an expected orientation of traffic participants, multiple possible orientations of traffic participants, and no orientation value of traffic participants.

5. The system of claim 1, wherein the calculation is based upon an assumption that all traffic is travelling parallel to the vehicle.

6. The system of claim 1, further comprising a notification indicator.

7. The system of claim 6, wherein the electronic controller is further configured to send the generated notification to the notification indicator.

8. The system of claim 1, wherein the electronic controller is further configured to track the traffic participant.

9. The system of claim 8, wherein the calculation is further based upon a determined likelihood that the tracked traffic participant is travelling at the estimated orientation.

10. The system of claim 1, the system further comprising a wireless transceiver.

11. The system of claim 10, wherein the electronic controller is further configured to send the generated notification to a remote location using the wireless transceiver.

12. A method implemented in a vehicle and of estimating an orientation of a traffic participant, the method comprising:
    generating, with a sensor, a signal,
    receiving, with an electronic controller, the generated signal,
    comparing, with the electronic controller, a location of the vehicle to a map of expected orientation of traffic participants to estimate an orientation of the traffic participant,
    performing, with the electronic controller, a calculation based upon the generated signal from the sensor to estimate an orientation of the traffic participant if an expected orientation is not determined by the comparison of the location of the vehicle to the map of expected orientation of traffic participants, and
    generating, with the electronic controller, a notification based upon the estimated orientation of the traffic participant.

13. The method of claim 12, wherein the signal from the sensor comprises at least one selected from the group of a distance to the traffic participant, an angle of the traffic participant relative to the vehicle, and a number of returns.

14. The method of claim 12, the method further comprising sending the generated notification to a notification indicator.

15. The method of claim 12, wherein the map of expected orientation of traffic participants is stored in a memory.

16. The method of claim 12, wherein, for each point on the map of expected orientation of traffic participants, the point has at least one selected from the group of a known orientation of traffic participants, an expected orientation of traffic participants, multiple possible orientations of traffic participants, and no orientation value of traffic participants.

17. The method of claim 12, wherein the calculation is based upon an assumption that all traffic is travelling parallel to the vehicle.

18. The method of claim 12, the method further comprising sending, with the electronic controller, the generated notification to a remote location via a wireless transceiver.

19. The method of claim 12, the method further comprising tracking, with the electronic controller, the traffic participant based upon the estimated orientation of the traffic participant.

20. The method of claim 19, wherein the calculation is further based upon a determined likelihood that the tracked traffic participant is travelling at the estimated orientation.

* * * * *